(12) United States Patent
Eronen et al.

(10) Patent No.: US 11,053,744 B2
(45) Date of Patent: Jul. 6, 2021

(54) FEED BEAM AND METHOD OF MANUFACTURING THE SAME

(71) Applicant: SANDVIK MINING AND CONSTRUCTION OY, Tampere (FI)

(72) Inventors: Kimmo Eronen, Pirkkala (FI); Anssi Hyvarinen, Tampere (FI); Paul Brown, Helsinki (FI); Stephen Connelly, Tampere (FI); Risto Kallinen, Nokia (FI); Sirpa Launis, Tampere (FI); Juha Piipponen, Tampere (FI); Esa Rantala, Tampere (FI); Teemu Majander, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 142 days.

(21) Appl. No.: 16/222,648

(22) Filed: Dec. 17, 2018

(65) Prior Publication Data
US 2019/0186206 A1  Jun. 20, 2019

(30) Foreign Application Priority Data
Dec. 18, 2017 (EP) .................... 17208050

(51) Int. Cl.
| E21B 15/00 | (2006.01) |
|---|---|
| E21B 7/02 | (2006.01) |
| B32B 1/08 | (2006.01) |
| B32B 27/06 | (2006.01) |
| B32B 27/08 | (2006.01) |
| B32B 5/18 | (2006.01) |
| B32B 27/40 | (2006.01) |

(52) U.S. Cl.
CPC ............ *E21B 15/00* (2013.01); *B32B 1/08* (2013.01); *B32B 5/18* (2013.01); *B32B 27/065* (2013.01); *B32B 27/08* (2013.01); *B32B 27/40* (2013.01); *E21B 7/025* (2013.01); *B32B 2262/106* (2013.01); *B32B 2266/0278* (2013.01); *B32B 2307/56* (2013.01); *B32B 2597/00* (2013.01)

(58) Field of Classification Search
CPC . E21B 15/00; E21B 7/025; B32B 1/08; B32B 2262/106
See application file for complete search history.

(56) References Cited

U.S. PATENT DOCUMENTS

| 4,020,202 | A | 4/1977 | Kreft |
|---|---|---|---|
| 6,086,084 | A | 7/2000 | Wemmenhove |
| 2009/0080815 | A1* | 3/2009 | Deutsch ............ E21B 19/08 384/42 |
| 2011/0248092 | A1 | 10/2011 | Nelson |
| 2013/0074086 | A1 | 11/2013 | To Lung Tak |
| 2014/0346811 | A1* | 11/2014 | Zaluzec ............ B29C 70/30 296/187.12 |
| 2017/0074086 | A1 | 3/2017 | Viitaniemi et al. |

FOREIGN PATENT DOCUMENTS

| DE | 2547897 A1 | 5/1977 |
|---|---|---|
| EP | 0159974 A2 | 10/1985 |
| WO | 2006097137 A1 | 9/2006 |

* cited by examiner

*Primary Examiner* — Caroline N Butcher
(74) *Attorney, Agent, or Firm* — Corinne R. Gorski

(57) ABSTRACT

A feed beam, a rock drilling unit and to a method of manufacturing a feed beam is provided. The feed beam includes a basic profile element, which has two or more superimposed material layers. At least one of the material layers may be made of a composite material.

8 Claims, 5 Drawing Sheets

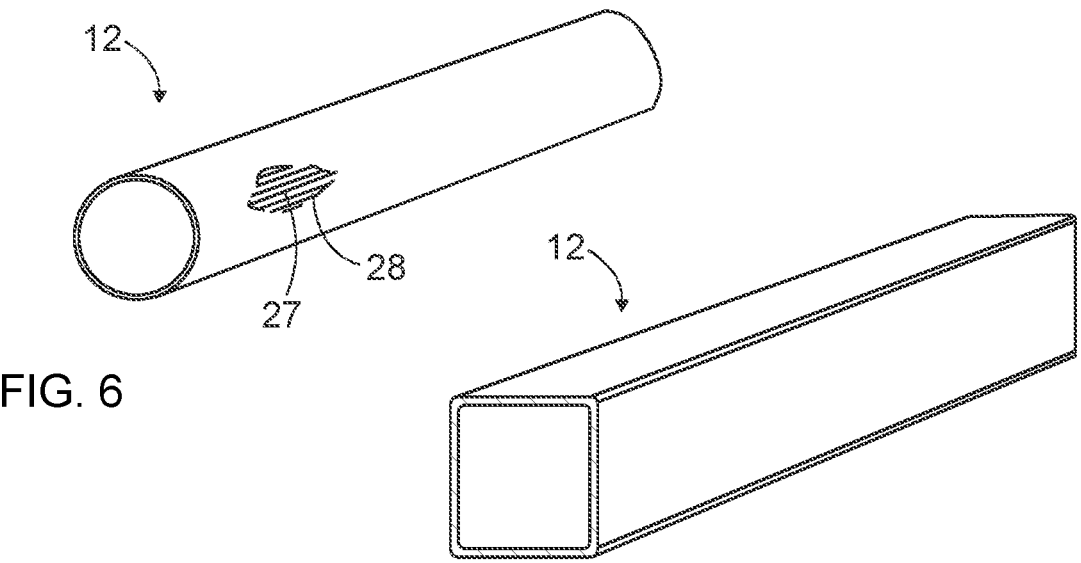
FIG. 6
FIG. 7
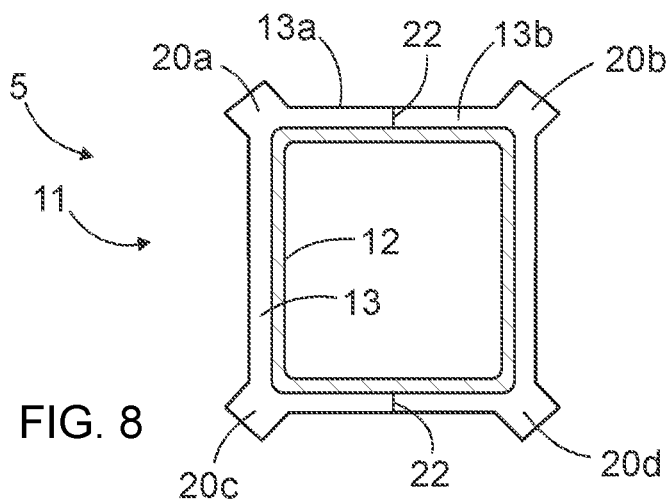
FIG. 8
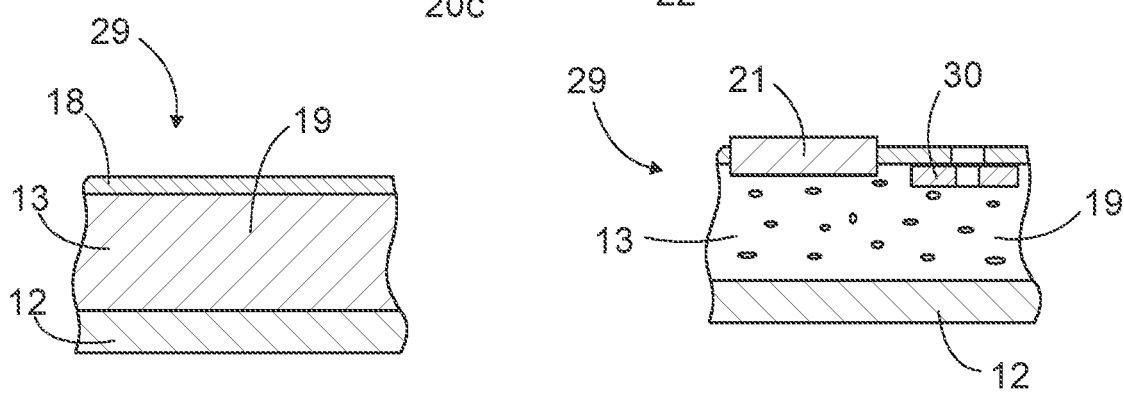
FIG. 9
FIG. 10

FEED BEAM AND METHOD OF MANUFACTURING THE SAME

RELATED APPLICATION DATA

This application claims priority under 35 U.S.C. § 119 to EP Patent Application No. 17208050.9 filed on Dec. 18, 2017, which the entirety thereof is incorporated herein by reference.

TECHNICAL FIELD

The present disclosure relates to a feed beam of a rock drilling unit. The feed beam is an elongated piece comprising support surfaces for supporting and guiding a rock drilling machine. The disclosure further relates to a method of manufacturing a feed beam.

BACKGROUND

In mines and at other work sites different type of rock drilling rigs are used. The rock drilling rigs are provided with one or more booms and rock drilling units are arranged at distal ends of the booms. The rock drilling unit comprises a feed beam along which a rock drilling device is configured to be moved during the drilling procedure. Modern feed beams consist of extruded aluminum profiles, which are relatively strong and light in weight. However, the present feed beams have still shown to contain some disadvantages.

SUMMARY

One aspect of the present disclosure is to provide a novel and improved feed beam.

An idea of the disclosed solution is that the feed beam of a drilling unit is an elongated piece including a basic profile element provided with support surfaces allowing a rock drilling machine to be supported movably on the feed beam. The feed beam includes one or more multi-layered longitudinal sections wherein a cross-section of the basic profile of the feed beam has two or more superimposed material layers, which are of different material relative to each other.

The multilayered section includes a two-layer composite structure, whereby the outer layer and the inner layer are made of two different composite materials both including reinforcing fibers and matrix material. As the structure of the feed beam includes several material layers it is referred to as a multilayer feed beam.

An advantage of the disclosed solution is that the feed beam can be construed extremely rigid and still light in weight. The structure of the feed beam may have light and rigid inner parts which are protected by means of an outer core. This way, it is possible to use extremely light and rigid materials in the inner structures of the feed beam and the outer core may ensure that the structure endures harsh conditions existing at the drilling site. The outer structure of the feed beam may protect the inner structures against wear, damages and moisture, for example.

A further advantage of the disclosed multilayer structure is that manufacturing of the feed beam may be flexible and design of the structure may be varied in versatile ways.

Further, the disclosed multilayered structure does not increase outer dimensions of the feed beam, which has positive effect on usability of the drilling unit. When the feed beam is stiffer, positioning of the feed beam may be more accurate. The feed beam may also be provided with versatile auxiliary devices and components since the stiffer structure allows greater payload to be supported by the feed beam. Mounting of the rod and tool handling devices and other auxiliary devices may also be executed more freely than in conventional feed beams. One additional benefit is that due to the disclosed stiff structure fatigue and service life of the feed beam may be extended. To sum up, the multilayer feed beam may enjoy the best material and structural properties of the two or more superimposed structural layers of the basic profile element.

According to an embodiment, the multilayered longitudinal section extends from a first end to a second end of the feed beam. In other words, the basic profile has a multilayer configuration from end to end. This way the strength of the structure is not compromised due not having discontinuities between the beam ends.

According to an embodiment, the multilayered longitudinal section extends by only a limited longitudinal section between the first end and the second end. With this solution only critical or otherwise desired portions include the disclosed multilayered structure and the other portions may have a single layer structure, for example.

According to an embodiment, the multilayered section includes an inner layer component and an outer layer component. The composite inner layer component may be designed to serve as a main load-bearing structure in the basic profile. The structure and material properties of the inner layer may be optimized regarding the load-bearing capability, and since composite material is used, the structure may be light in weight.

According to an embodiment, between the inner layer component and the outer layer component is at least one intermediate layer component. The intermediate layer may be made of composite material. By means of the one or several intermediate layers properties of the basic profile element may be further influenced. Since the intermediate layers are located under the outer layer, they are well protected, whereby properties and materials of the intermediate layers may be selected relatively freely according to the need.

According to an embodiment, the composite materials may include carbon fibers as reinforcements and thermoplastic and/or thermoset resin as matrix or binding material.

According to an embodiment, the outer layer is a protective layer, which is configured to provide protection for the layers it envelopes against external forces and circumstances. It is possible to provide the outermost layer with one or more coatings for additionally improving the protective properties.

According to an embodiment, the outer layer component is made of metal material. Suitable metal materials for the purpose are aluminum, titanium, magnesium and other suitable light weight alloys. High strength steel material may also be implemented.

According to an embodiment, the outer layer component has a shell structure including an enveloping outer shell structure and a dampening structure. In other words, the outer shell portion may provide the outer layer with a relatively strong and closed cover part which covers the dampening portion, and which may be formed of a softer material. Thus, the outer layer component may have two or more different polymer materials. The outer shell portion may be made of a fiber reinforced composite material or another stiff polymer material, for example. The dampening portion may be made of a resilient or remoldable material, which may reshape under influence of external force and may thereby dampen effects of the force. Suitable materials for the dampening part may be rubber-like materials and polyurethane, for example. Further, plastic and polymer foams may also be used.

According to an embodiment, at least the multilayered section of the feed beam has an inner surface the shape of which is round. The structure may comprise an inner component which is a tubular piece. On an outer surface side of the tubular inner component is formed one or more additional material layers, or is mounted one or more additional outer layer components.

According to an embodiment, a cross-section of the feed beam includes at least at the multilayered section a hollow space, which is configured to serve as a mounting space for a feed device, whereby the feed beam is configured to envelope the feed device. The feed device may include one or more actuators, such as hydraulic cylinders, which may be located inside the space defined by the inner layer of the basic profile element of the feed beam.

According to an embodiment, inside the hollow space is at least one supply passage or conduit. Thus, hydraulic feed and discharge hoses and tubes, as well as electric power and sensing wires may be arranged inside the inner space of the feed beam. Inside the hollow space the cannels and conduits are well protected and do not cause entanglement and visibility obstacles.

According to an embodiment, the basic profile of the feed beam includes an outer layer component, which is formed of two halves, whereby it is easy to mount on other layer structures or components of the basic profile element. Alternatively, the cross-section of the outer layer component may consist of three, four or even greater number of elements, which together form the outer shell of the feed beam. The outer layer components may be fastened to each other and to the other layers by means of gluing or other bonding techniques, for example.

According to an embodiment, the feed beam includes an inner layer component and an outer layer component, which are superimposed. The outer layer component is mounted in a removable manner on the inner layer component. Thus, the outer layer component may be a changeable component.

According to an embodiment, the outer layer component is a sacrificial component and is made of repairable material. In other words, the design and material of the outer layer component may be selected so that it can be fixed easily, fast and without any special tools.

According to an embodiment, the cross sectional shape of the feed beam is closed. In other words, the basic profile element is a kind of box structure which is beneficial when considering strength properties of the structure. Further, the outer layer component may comprise several protrusions extending away from the feed beam. The protrusion may serve as support portions and mounting surfaces for different devices. The protrusions may also improve strength properties of the basic profile element. The outer layer component may be configured to provide the feed beam with a round cross-sectional shape with the exception of the mentioned protrusions.

According to an embodiment, the outer layer component is provided with several support protrusions serving as support elements for the rock drilling machine. Outer surfaces of the support protrusions include slide surfaces on which slide surfaces a carriage may be moved by means of a feed device. In other words, the carriage and the feed beam may be slide bearing therebetween. The rock drill machine is mounted on the carriage.

According to an embodiment, the number of the support protrusions may be four and are evenly spaced on an outer periphery of the feed beam. The four evenly spaced support protrusions may imitate conventional feed beams with rectangular a cross-section. The disclosed four support protrusions guarantee sufficient support for the carriage and the drilling machine mounted on it.

According to an embodiment, the support protrusions are provided with separate slide components on their outer surface. The slide components may be easily replaceable elements, which may be connected on the support protrusions by means of shape locking and friction between the surfaces of the protrusions and the slide components. Additional openable mechanical fastening elements, such as fastening screws, may also be applied. The slide components may be made of suitable wear resisting plastic material. Alternatively, the slide components may be made of metal material, such as stainless steel, whereby the carriage may be provided with plastic slide pieces, which are supported against the steel elements serving as counter parts.

According to an embodiment, the slide surfaces are integrated so as to be part of the support protrusions of the outer layer. When the outer layer or component of the basic profile element of the feed beam is made of composite material of suitable polymer material, then slide elements or pieces forming the slide surfaces may be inserted partly inside the structure of the outer structure. Thereby, the slide elements have rigid fastening and no separate mounting step is needed.

According to an embodiment, the outer layer component is provided with at least one mounting protrusion for fastening auxiliary devices to the drilling unit.

According to an embodiment, the outer layer component includes two mounting protrusions, which are located on opposite sides of the feed beam. The outer layer component is made of two halves both having joint surfaces. Further, the joint surfaces are located at the mounting protrusions. When the joint surfaces are located at the mounting protrusions, the surface area of the joint surfaces can be made large enough for bonding, and further, the mounting protrusions may be provided with mechanical fastening elements for connecting the joint surfaces to each other.

According to an embodiment, the cross-sectional shape of the mounting protrusion is configured to widen towards a distal end of the protrusion. This way, the shape of the mounting protrusion facilitates mounting of different auxiliary devices.

According to an embodiment, the inner layer component has a uniform cross-sectional shape without any seams.

According to an embodiment, the inner layer component is dimensioned so that it is a primary load bearing component and the outer layer component is a secondary load bearing component.

According to an embodiment, the inner layer component has a tubular cross-section and extends as a uniform single piece from end-to-end of the feed beam.

According to an embodiment, a rock drilling unit includes a feed beam and a rock drilling machine is supported on the feed beam. A feed device is configured to move the drilling machine longitudinally on the feed beam. The feed beam of the drilling unit includes a multilayered basic profile element. Further, the rock drilling unit may be arranged to a drilling boom of a rock drilling rig. The rock drilling rig may be a surface drilling rig or an underground drilling rig. The rock drilling unit may be a production drilling unit or it may be arranged in connection with a rock bolting device, for example. The rock drilling device of the rock drilling unit may include an impact device for executing percussion drilling, or alternatively, the drilling may be based on rotation of a drilling tool only.

According to an embodiment, one or more of the superimposed layers of the feed beam are made of composite material and are formed by means of a laminating technique. An advantage of the laminating technique is that number of the laminated layers, their materials as well as directions of the reinforcing fibers, may be easily chosen according to the need. In other words, the laminating technique offers multiple variations to be implemented for the structures and properties of the components of the multilayered basic profile element. The included reinforcing layers are relatively easy to laminate together with the matrix material directly on a mandrel, for example. As an alternative to the machine or manually laminated layers, prepregs may be implemented. The prepregs have reinforcement fiber elements which are pre-impregnated with thermoplastic or thermoset resin matrix in a certain ratio. Furthermore, the manufacturing of the composite layers may be based on resin transfer moulding (RTM) techniques and use of dry fibers with infusion.

According to an embodiment, the multilayer feed beam includes at least one outer layer component, which is a spare part that is easily mountable and dismountable on the basic profile element of the feed beam. Alternatively, or in addition to, the spare part may include a heat and/or pressure activated bonding agent for the fastening.

According to an embodiment, the multilayer feed beam includes at least one pre-tensioned element tensioned longitudinally between two structural elements of the basic profile element of the feed beam. The tensioning increases significantly rigidity of the feed beam. The basic profile element may be provided with one or more tensioning bars or corresponding elongated elements ends of which are provided with tensioning elements such as screws and which may be arranged at least partly inside a longitudinal space of one of the superimposed layers of the basic profile element. The tensioning bar may be a carbon composite rod, for example.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE FIGURES

FIG. 6 is a schematic view of an inner layer component which is a tubular piece and includes at least longitudinal reinforcements and matrix material.

FIG. 7 is a schematic view of an alternative inner layer component which is an elongated piece having a rectangular cross-sectional shape.

FIG. 8 is a schematic cross-sectional view of a two-layer feed beam, wherein inner and outer layer components are elongated pieces both having substantially rectangular cross-sections.

FIG. 9 is a schematic cross-sectional side view of a wall structure of a multi-layered feed beam.

FIG. 10 is schematic cross-sectional side view of a wall structure of a feed beam, wherein the structure includes an integrated slide component and an integrated mounting point.

For the sake of clarity, the figures show some embodiments of the disclosed solution in a simplified manner. In the figures, like reference numerals identify like elements.

DETAILED DESCRIPTION

Figure 1:
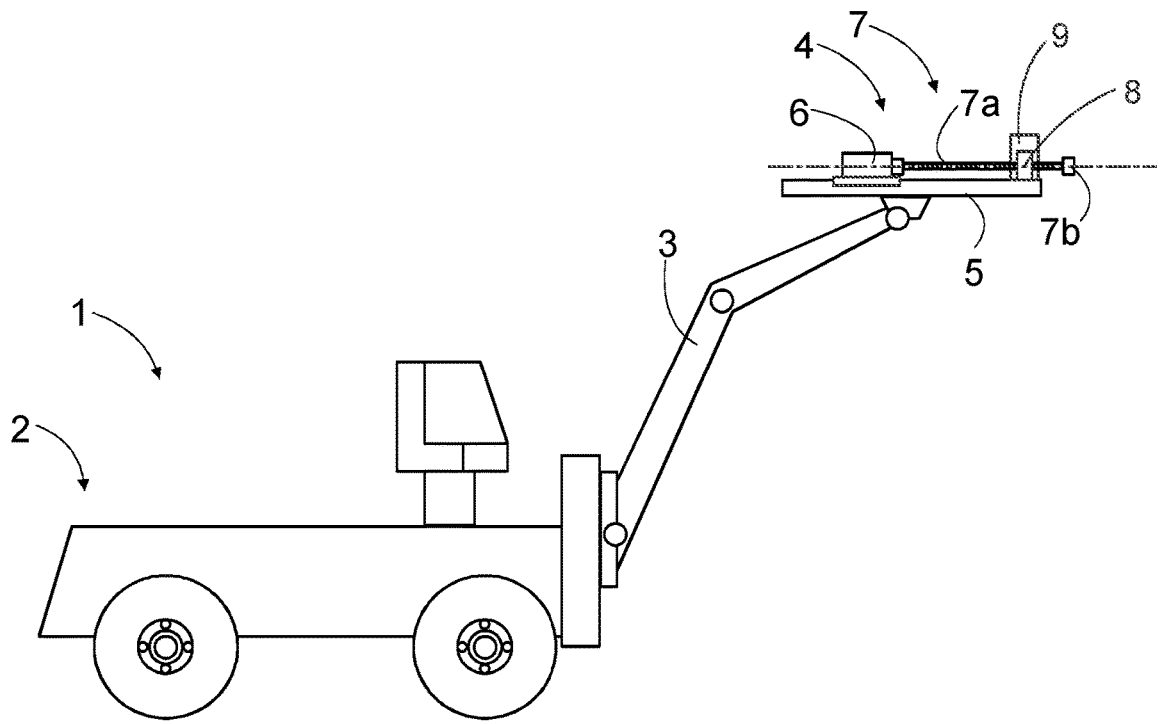
FIG. 1 is a schematic side view of a rock drilling rig for underground drilling provided with a drilling boom equipped with a drilling unit.

FIG. 1 shows a rock drilling rig 1 as an example of a mine vehicle having a feed beam. Also, rock bolting rigs, charging rigs and measuring vehicles may include booms provided with feed beams. The improved feed beam disclosed herein may be applied in all type of feed beams implemented in mine operations.

The rock drilling rig 1 may have a movable carrier 2 and one or more booms 3 connected to the carrier 2. At a distal end portion of the boom 3 may be a drilling unit 4. The drilling unit 4 may have a feed beam 5 and a rock drilling machine 6 supported on it. The rock drilling machine 6 may include a shank at a front end of the rock drilling machine 6 for connecting a tool 7. Further, the drilling unit 4 may include one or more rod handling devices 8, such as a tool hold device, a tool changing apparatus or manipulator and a tool magazine or storage. In addition to this, one or more additional devices 9 may be supported to the feed beam 5. Thereby, the feed beam is subjected to several different loads during the operations and still it should be light in weight and rigid enough to allow accurate positioning for a drill bit 7b mounted to a front end of the tool 7 including one or more drilling rods 7a.

Figure 2:
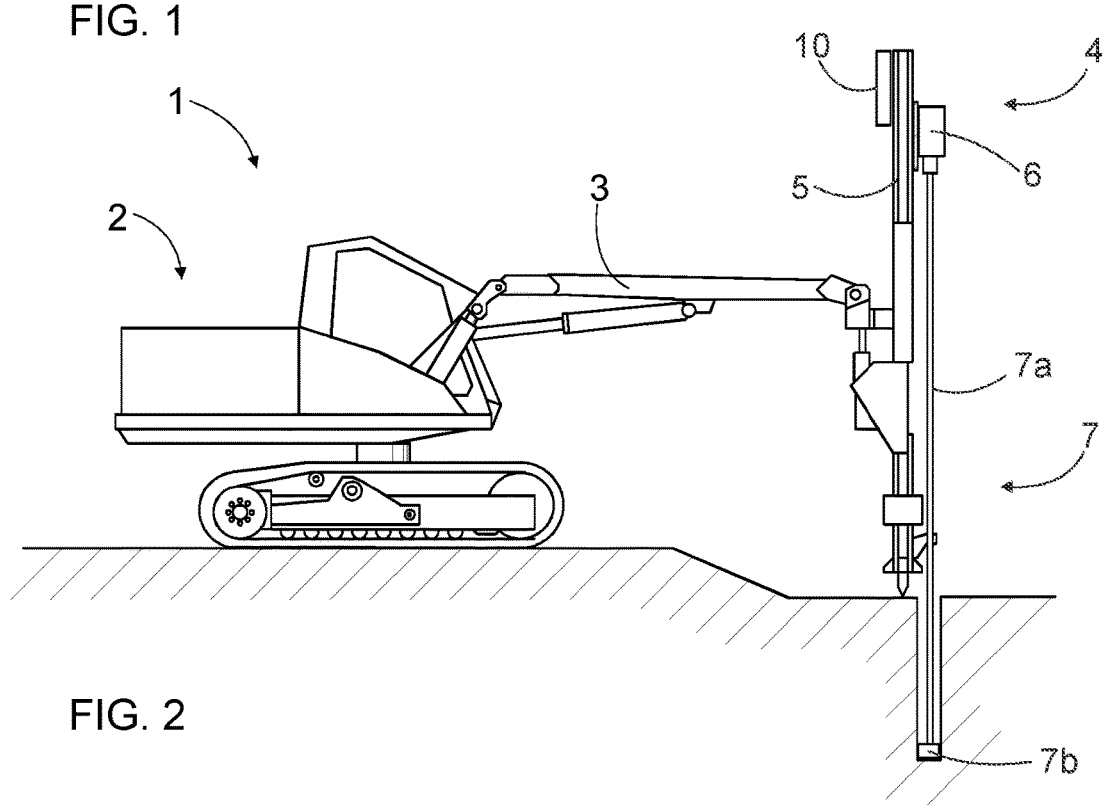
FIG. 2 is a schematic side view of a rock drilling rig for surface drilling provided with a drilling unit.

In FIG. 1 the rock drilling rig 1 is operating in an underground mine space, which may be a tunnel, storage hall or corridor, for example. FIG. 2 discloses a surface rock drilling rig 1, which also includes a carrier 2, a boom 3 and a drilling unit 4 provided with a feed beam 5. A rock drilling machine 6 is supported on the feed beam 5 and may be moved in the drilling direction and reverse direction by means of a feed device 10. The feed beam 5 may be equipped with needed auxiliary devices and components.

Figure 3:
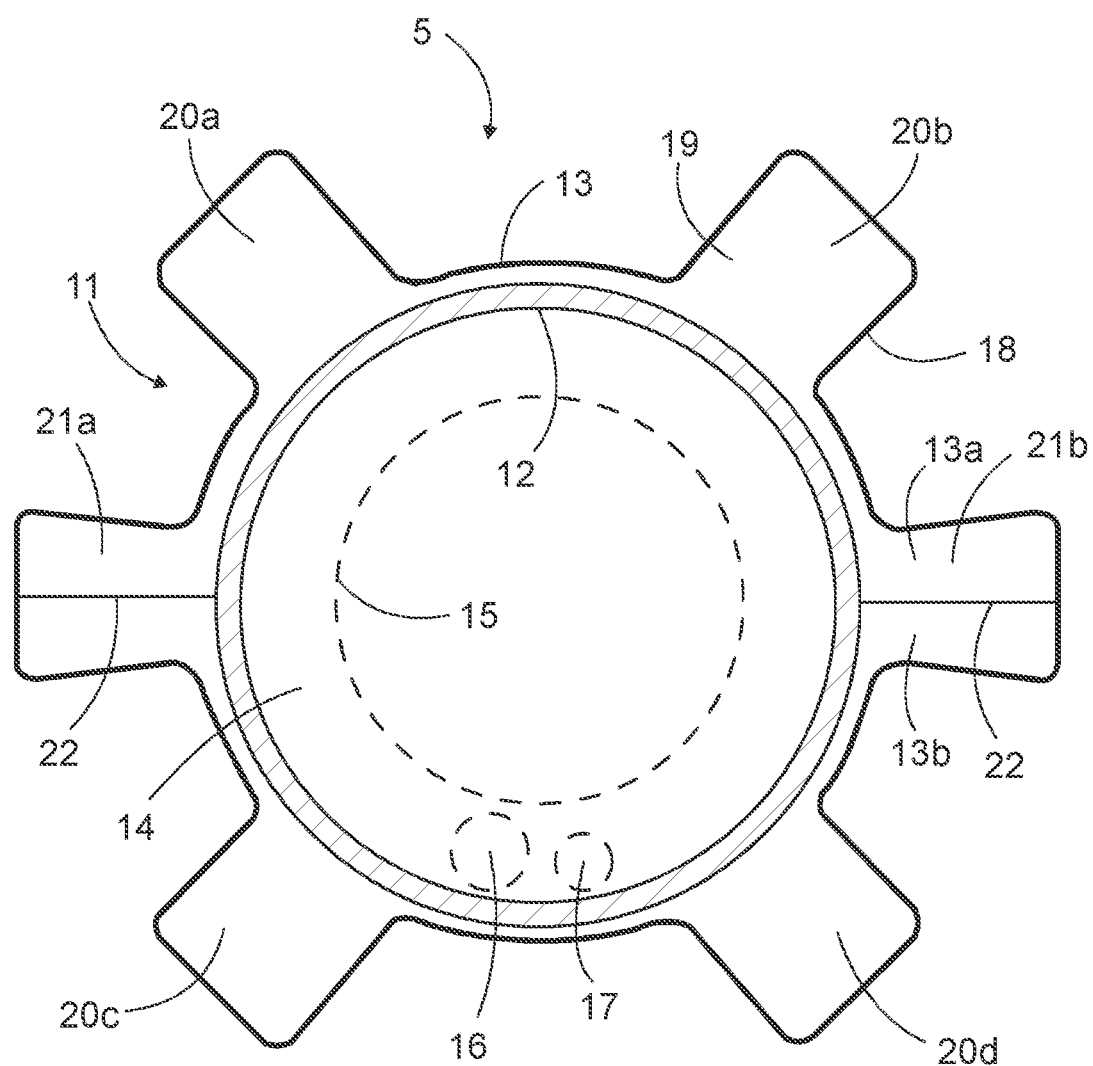
FIG. 3 is a schematic cross-sectional view of a multilayered feed beam seen in the longitudinal direction and having an inner layer component and an outer layer component.

FIG. 3 discloses a multilayered feed beam 5 including a basic profile element 11 having an inner layer component 12 and an outer layer component 13. The inner layer component 12 is an elongated piece which may have a round cross-section. The inner layer component 12 may be enveloped by means of an outer layer component 13. The inner layer component 12 and the outer layer component 13 may be both made of composite material. The inner layer component 12 may be configured to predominantly receive bending and torsional loadings directed to the feed beam. The outer layer component 13 may provide the inner layer component 12 with mechanical protection against damage and environmental issues. Inside the inner layer component 12 may be a hollow space 14, which can receive a feed device 15 of the drilling unit. Further, the hollow space 14 may envelope and provide protection also for supply passages 16 and electrical wires 17 if need be.

The outer layer component 13 may have an outer shell 18, which may be a rigid part, and a dampening portion 19, which may be made of softer material and is capable of receiving and dampening external forces. The outer layer component 13 further includes several support protrusions 20a-20d, wherein support protrusions 20a and 20b are for supporting a carriage to the feed beam 5, or alternatively, to support a drilling machine directly without the carriage to the feed beam 5. Support protrusions 20c and 20d are for supporting the feed beam 5 to a drilling boom of corresponding support structure. The outer layer component 13 further includes one or more mounting protrusions 21a, 21b for mounting different auxiliary devices to the feed beam 5.

The outer layer component 13 may be formed of two halves 13a, 13b, which are connected to each other at the mounting protrusions 21a, 21b, wherein joint surfaces 22 are placed against each other. Alternatively, the outer layer component 13 may be manufactured directly on the inner layer components 12 by means of laminating or moulding techniques, for example.

Figure 4:
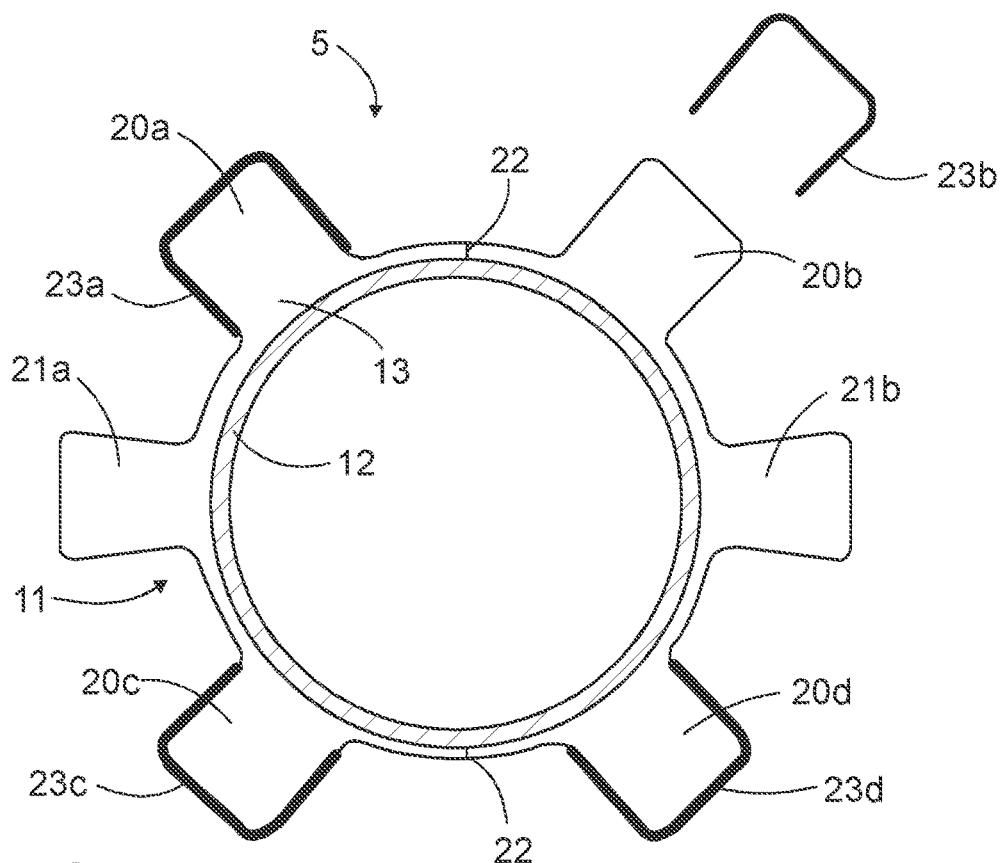
FIG. 4 is a schematic longitudinal view of a two-layer structured feed beam having support protrusions and removable slide components arranged on the protrusions.

FIG. 4 discloses a feed beam 5 with a basic profile element 11 that has a substantially similar structure as the feed beam of FIG. 1. However, joint surfaces 22 are not located at mounting protrusions 21a, 21b as the previous of FIG. 1. Support protrusions 20a-20d may be provided with separate slide components 23a-23d. The slide components 23 may be longitudinal profile elements with substantially U-shaped cross-sections. Thus, the slide components 23 may simply be pushed on the support protrusions 21 and may be additionally fastened by means of a bonding agent or by utilizing mechanical fasters. In some cases, mounting of the slide components may be based shape locking and friction only. The slide components may be made of metal material or suitable polymer material.

Figure 5:
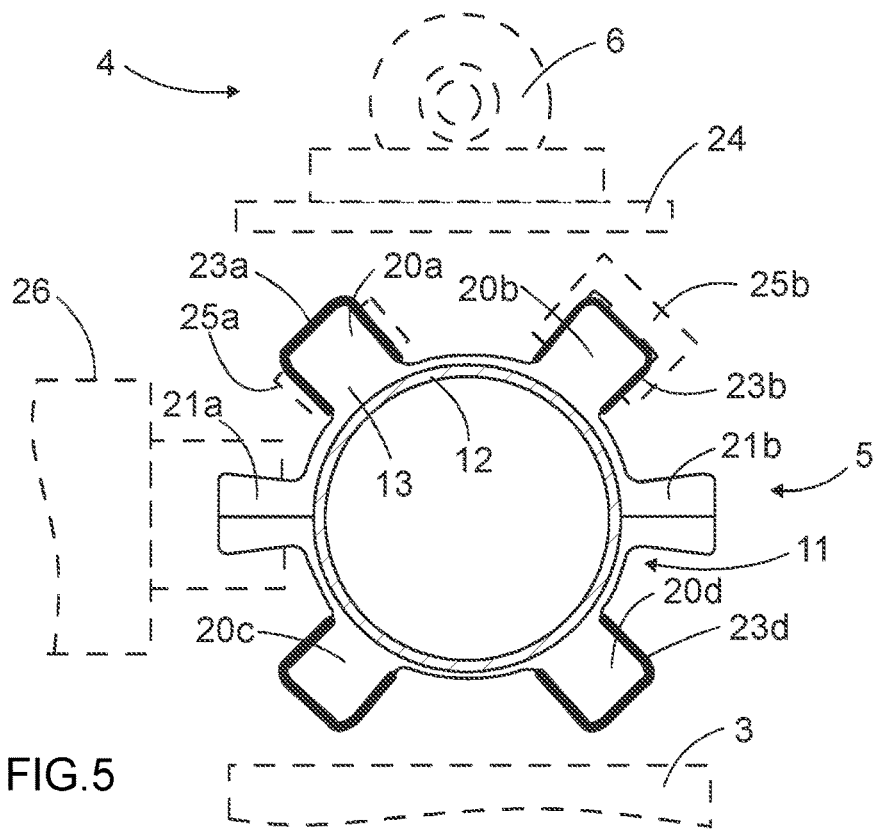
FIG. 5 is a schematic longitudinal view of a multilayered feed beam which is provided with mounting protrusions for supporting auxiliary devices.

FIG. 5 discloses a feed beam 5, which is connected movably to a drilling boom 3 by support protrusions 20c and 20d. The feed beam 5 is arranged to support a drilling unit 4 movably thereon. A rock drilling machine 6 may be mounted on a carrier 24, which may be supported movably to support protrusions 20a, 20b. On the support protrusions 20a, 20b may be slide components 23a, 23b against which slide pieces 25a or 25b of the carrier 24 may be supported. FIG. 5 further discloses that one or more auxiliary devices 26 may be supported to mounting protrusions 21a, 21b of an outer layer component 13 of the basic profile element 11.

FIG. 6 discloses that an inner layer component 12 of a basic profile element is an elongated piece and may be made of composite material comprising fibre reinforcements 27 and matrix material 28. The fibre reinforcements 27 may be orientated longitudinally or to any other optimum fibre angle. In FIG. 6 the cross-sectional shape of the inner layer component 12 is round and in FIG. 7 the shape is rectangular.

FIG. 8 discloses a two-layer feed beam 5 including two substantially rectangular hollow and longitudinal layer components 12, 13, which are superimposed. At corners of outer layer component 13 are support protrusions 20a-20d, which may be provided with integrated or separate slide components. The outer layer component 13 may be made of two or more components 13a, 13b, which may be connected to each other at connecting joints 22.

FIG. 9 discloses a wall structure 29 of a basic profile element. The wall structure 29 includes an inner layer component 12 and an outer layer component 13. The outer layer component 13 may include a rigid outer shell 18 and dampening portion 19. The inner and outer layer components may both be made of composite material.

FIG. 10 discloses a wall structure 29, which differs from the structure disclosed in FIG. 9 in that the dampening portion 19 is made of foam-like material, for example. Further, FIG. 10 discloses that a slide element 21 may be integrated to be an inseparable part of the outer layer 13. The outer layer 13 may also include one or more fastening elements 30 allowing mounting of different auxiliary devices, by means of screw fastening, for example.

Figure 11:
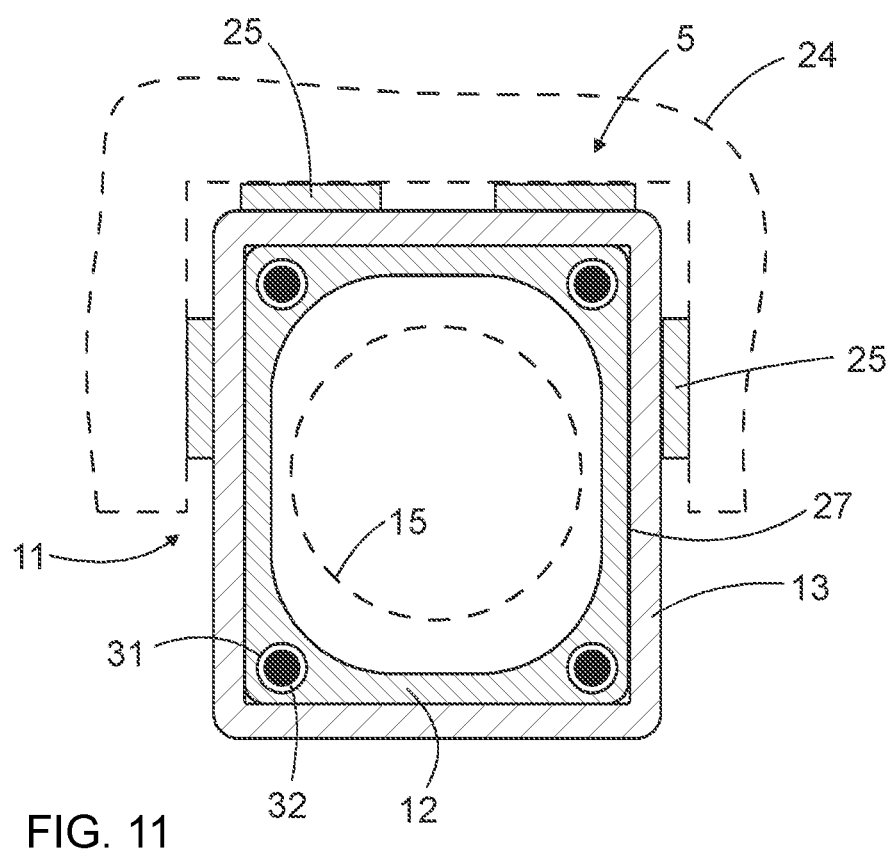
FIG. 11 is a schematic longitudinal and cross-sectional view showing a two-layered feed beam provided with pre-tensioned stiffening elements arranged at corners of an inner layer component.

FIG. 11 discloses a feed beam 5 having substantially rectangular and superimposed layer components 12, 13. A carrier 24 may be supported against top and side surfaces of outer layer component 13 by means of slide pieces 25. Inner layer component 12 may include longitudinal hollow spaces 31 at corner areas. The hollow spaces 31 may be provided longitudinal stiffeners 32. The stiffeners may be made of composite material and they may be pre-tensioned by means of suitable tensioning means, such as screw elements. Other type of stiffening and pre-tensioning bars and pieces may also be used. The composite layers may also be provided with needed fastening elements or inserts for facilitating mounting of auxiliary devices, for example.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A feed beam of a drilling unit, the feed beam comprising:
   a basic profile element provided with support surfaces arranged to support a rock drilling machine movably on the feed beam, the basic profile element being an elongated piece and having at least one multilayered longitudinal section, wherein a cross-section of the at least one multilayered longitudinal section is a two-layer composite structure having an inner layer component and an outer layer component, whereby the outer layer component and the inner layer component are superimposed and made of two different composite materials both including reinforcing fibers and a matrix material, and wherein the outer layer component is mounted in a removable manner on the inner layer component to thereby be a changeable component.

2. The feed beam as claimed in claim 1, wherein at least the multilayered longitudinal section of the feed beam has an inner surface having a round shape.

3. The feed beam as claimed in claim 1, wherein the cross-section of the basic profile of the feed beam has, at least at the longitudinal multilayered section, a hollow space, which is configured as a mounting space for a feed device, whereby the feed beam is configured to envelope the feed device.

4. The feed beam as claimed in claim 1, wherein the cross-sectional shape of the basic profile of the feed beam is closed, the outer layer component including several protrusions extending away from the feed beam, the outer layer component being configured to provide the feed beam with a round cross-sectional shape with the exception of the protrusions.

5. The feed beam as claimed in claim 1, wherein the outer layer component is provided with several support protrusions arranged as support elements for the rock drilling machine, the outer surfaces of the support protrusions including slide surfaces.

6. The feed beam as claimed in claim 1, wherein the outer layer component is provided with at least one mounting protrusion arranged for fastening auxiliary devices to the drilling unit.

7. The feed beam as claimed in claim 1, wherein the inner layer component has a uniform cross-sectional shape without any seams.

8. A rock drilling unit, comprising:
a feed beam;
a rock drilling machine supported on the feed beam; and
a feed device arranged for moving the drilling machine longitudinally on the feed beam, the feed beam including at least one multilayered longitudinal section, wherein a cross-section of the multilayered longitudinal section is a two-layer composite structure having an inner layer component and an outer layer component, whereby the outer layer component and the inner layer component are superimposed and made of two different composite materials both including reinforcing fibers and a matrix material, and wherein the outer layer component is mounted in a removable manner on the inner layer component to thereby be a changeable component.

* * * * *